US008995440B1

(12) United States Patent
LeBlanc et al.

(10) Patent No.: US 8,995,440 B1
(45) Date of Patent: Mar. 31, 2015

(54) IN-FLIGHT INFORMATION DISTRIBUTION SYSTEM, DEVICE, AND METHOD FOR A PORTABLE ELECTRONIC DEVICE

(71) Applicants: Marc B. LeBlanc, Ladera Ranch, CA (US); Michael T. Diekmann, Orange, CA (US); Ara J. Derderian, Trabuco Canyon, CA (US)

(72) Inventors: Marc B. LeBlanc, Ladera Ranch, CA (US); Michael T. Diekmann, Orange, CA (US); Ara J. Derderian, Trabuco Canyon, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 126 days.

(21) Appl. No.: 13/624,172

(22) Filed: Sep. 21, 2012

(51) Int. Cl.
*H04L 12/28* (2006.01)
*H04L 29/06* (2006.01)
*H04L 29/12* (2006.01)
*G06F 17/30* (2006.01)
*G01C 21/36* (2006.01)

(52) U.S. Cl.
CPC .... *H04L 29/06047* (2013.01); *H04L 29/12924* (2013.01); *G06F 17/30876* (2013.01); *G01C 21/3667* (2013.01)
USPC ........................................................ 370/390

(58) Field of Classification Search
CPC ........................................ H04L 69/326–69/329
USPC .......... 370/395.5; 455/3.01; 710/14, 409, 454
See application file for complete search history.

(56) References Cited

U.S. PATENT DOCUMENTS

| 2009/0036090 A1* | 2/2009 | Cho et al. ........................ 455/345 |
| 2009/0291631 A1* | 11/2009 | Xue et al. ....................... 455/3.01 |
| 2011/0246002 A1* | 10/2011 | Shavit ............................. 701/14 |
| 2012/0232791 A1* | 9/2012 | Sterkel et al. .................. 701/454 |

OTHER PUBLICATIONS

"The next generation of in-flight information distribution", Airshow ® 4000, 2009, Rockwell Collins.

* cited by examiner

*Primary Examiner* — Michael Thier
*Assistant Examiner* — Yaotang Wang
(74) *Attorney, Agent, or Firm* — Angel N. Gerdzhikov; Donna P. Suchy; Daniel M. Barbieri

(57) ABSTRACT

Present novel and non-trivial system, device, and method for the distribution of in-flight information to a portable electronic device ("PED") are disclosed. The system could be comprised of a cabin entertainment unit and one or more PEDs, where the cabin entertainment unit could be a device comprised of a discovery datagram generator, a flight navigation datagram generator, a file transfer protocol/hypertext transfer protocol ("FTP/HTTP") server storing a custom map configuration file, and/or a trackline data generator. A discovery datagram could provide a plurality of network addresses from which the PED may listen for and receive flight navigation datagrams repeatedly, request and receive the custom map configuration file, and request and receive trackline data representative of the ground track already flown by the aircraft.

12 Claims, 3 Drawing Sheets

IN-FLIGHT INFORMATION DISTRIBUTION SYSTEM, DEVICE, AND METHOD FOR A PORTABLE ELECTRONIC DEVICE

BACKGROUND OF THE INVENTION

1. Field of the Invention

This invention pertains to the field of aircraft cabin entertainment systems and/or networks and, in particular, distribution systems of in-flight information.

2. Description of the Related Art

In-flight information distribution systems may present an occupant or passenger of an aircraft with a variety of in-flight information related to the flight of an aircraft in which he or she occupies. An example of an in-flight distribution system is the Rockwell Collins' Airshow® 4000 system configurable to provide moving map displays, where each such display may present a colorful and graphical flight path of the aircraft (both the projected flight path and the already-flown ground track) against the background of colorful two-dimensional or three-dimensional moving map, wherein the surface of the Earth is shown as a flat, two-dimensional surface or as a spherical, three-dimensional surface.

The display of in-flight information could include information such as the departure city, estimated departure time, actual departure time, estimated time enroute, estimated time of arrival, geographic position, altitude, heading, speed, vertical speed, outside air temperature, mach number, total distance, and total time. In addition, other non-flight related information such as news and entertainment information (e.g., real-time news, stocks, sports, and weather) may be presented.

Although in-flight information distribution systems are useful and have enjoyed a long history of use, the presentation of information has been limited to display units installed on the aircraft. Examples of such display units include those attached to a cabin bulkhead, installed in the seat back of the seat located in front of the viewer, and attached to a seat armrest folding assembly. The distribution of in-flight information has not included a distribution of information to a portable electronic device ("PED") that could be carried on-board by a passenger.

BRIEF SUMMARY OF THE INVENTION

The embodiments disclosed herein present at least one novel and non-trivial system, device, and method for distributing in-flight information to a PED.

In one embodiment, a system is disclosed for distributing in-flight information to the viewer of the PED. The system could be comprised of a cabin entertainment unit and one or more PEDs, where the cabin entertainment unit could be comprised of a discovery datagram generator, a flight navigation datagram generator, a file transfer protocol/hypertext transfer protocol ("FTP/HTTP") server for the storage a custom map configuration file, and a trackline data generator.

In another embodiment, a device is disclosed for distributing in-flight information to the PED located on-board an aircraft, where the device is comprised of the discovery datagram generator, the flight navigation datagram generator, the file transfer FTP/HTTP server, and the trackline data generator. A discovery datagram could provide network address information including an address associated with a URL of the FTP/HTTP server, an address associated with an internet protocol ("IP") of a user datagram protocol ("UDP") broadcast of a flight navigation datagram, and the address associated with the IP of the transmission control protocol ("TCP") connection of the trackline data. Also, the discovery datagram could provide version information of the custom map configuration file. The flight navigation datagram could be representative of information provided by the navigation system installed on the aircraft, and the trackline data could be representative of information related to the actual ground track flown by the aircraft.

In another embodiment, a method is disclosed for receiving the distribution of in-flight information. This method could be performed by the PED configured to listen for and receive the discovery datagram via an address corresponding to an IP address and port number of a UDP broadcast of the discovery datagram. After receiving the discovery datagram, the PED could be configured to listen for and receive the flight navigation datagram repeatedly via an IP address and port number of a UDP broadcast of the flight navigation datagram. Also, the PED could be configured to request and receive a custom map configuration file via the address associated with a URL of the FTP/HTTP server. Also, PED could be configured to request and receive trackline data via the address associated with an IP address and port number of a TCP connection of the trackline data.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
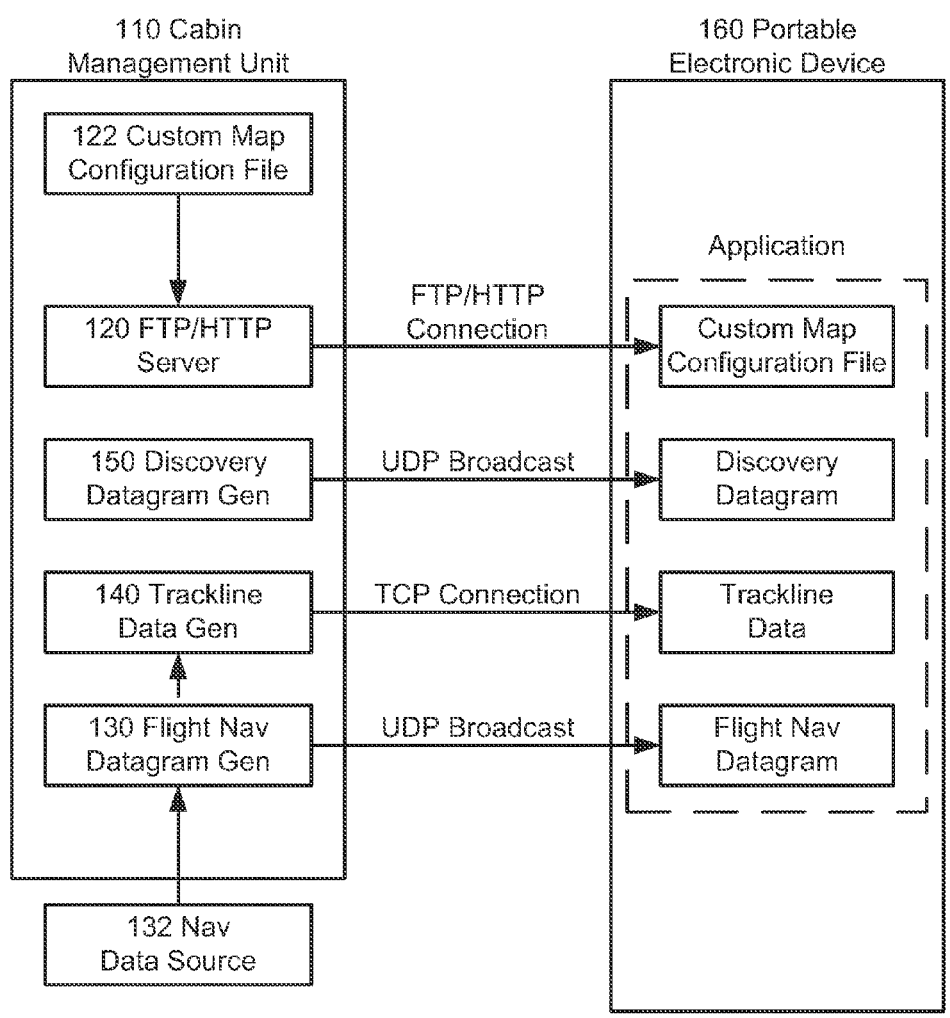
FIG. 1 depicts a block diagram of an in-flight information distribution system for a PED.

FIG. 1 depicts a block diagram of an in-flight information distribution system (collectively, "distribution system") 100 suitable for implementation of the techniques described herein. The distribution system 100 of an embodiment of FIG. 1 includes a cabin entertainment unit 110 and a portable electronic device ("PED") 160, where the cabin entertainment unit 110 may be comprised of a FTP/HTTP server 120, a flight navigation datagram generator 130, a trackline data generator 140, and/or a discovery datagram generator 150.

In an embodiment of FIG. 1, the FTP/HTTP server 120 could be comprised of any computer configured to store, retrieve, and send a custom map configuration file 122 upon a request. The custom map configuration file 122 could be any file configured or tailored to the requests or needs of an owner or operator of an aircraft, where a newer version may be replace a current version. When sent to the presentation application running of the PED 160 running an application such as, but not limited to, the "Rockwell Collins Airshow® for iPad" application ("Airshow app"), information content stored in the custom map configuration file 122 such as, but not limited to, customized images, fonts, colors, images, and/or corporation logos that may be displayed on the screen of the PED 160 as specified by the owner or operator of the aircraft. Also, a symbol of an aircraft that is displayed could correspond to the type of aircraft being flown and in which the viewer is an occupant. As embodied herein, the server 120 may be configured with a uniform resource location ("URL") address and accessible wirelessly to the Airshow app through the use of a network protocol such as a file transfer protocol ("FTP") or a hypertext transfer protocol ("HTTP"). The use of these protocols as well as other protocols such as, but not limited to, the protocols of an internet protocol ("IP") suite is known to those skilled in the art.

In an embodiment of FIG. 1, the flight navigation datagram generator 130 could be comprised of any electronic processor configured to repeatedly generate and broadcast a flight navigation datagram using a user datagram protocol ("UDP") via an address (i.e., the flight navigation address) corresponding to an IP address and port number of a UDP broadcast. It should be noted that the term "broadcast" as used herein is synonymous with the term "multicast" and may be used interchangeably. The flight navigation datagram may be comprised of navigation data provided by a source of navigation data 132, where such source could be comprised of any aircraft system configured to provide the distribution system 100 with real-time flight information. The navigation system 120 may include, but is not limited to, an air/data system, an attitude heading reference system, an inertial guidance system (or inertial reference system), a global navigation satellite system (or satellite navigation system), and a flight management system ("FMS"), all of which are known to those skilled in the art. The source of navigation data 132 could provide flight information including, but not limited to, departure city, estimated departure time, actual departure time, estimated time enroute, estimated time of arrival, active flight plan comprised of a series of waypoints on which the aircraft is expected to fly, ground track information of the track over the ground already flown by the aircraft, geographic position, altitude, current heading, speed, vertical speed, outside air temperature, and mach number. When the flight navigation datagram is broadcast, the Airshow app running on the PED 160 may use the flight information in the generation of an image data set as discussed in detail below.

The flight navigation datagram generator 130 (and the trackline data generator 140, the discovery datagram generator 150, and the PED 160) (collectively, "system electronic processors") may be comprised of any electronic data processing unit or combination of electronic data processing units which execute software or computer instruction code that could be stored, permanently or temporarily, in at least one digital memory storage device or a computer-readable medium (not depicted herein) including, but not limited to, RAM, ROM, CD, DVD, hard disk drive, secure digital cards, and/or compact flash cards. The system electronic processors may be driven by the execution of software or source code containing algorithms developed for the specific functions embodied herein. Common non-exclusive examples of system electronic processors are microprocessors, Digital Signal Processors, Programmable Logic Devices, Programmable Gate Arrays, and signal generators; however, for the embodiments herein, the terms content controller, the system electronic processors are not limited to these units and its meaning is not intended to be construed narrowly.

The system electronic processors may be programmed or configured to receive as input data and/or provide output data as discussed in detail below. As embodied herein, the terms "programmed" and "configured" are synonymous with respect to the execution of software or source code developed for the specific functions and methods embodied herein. Each system electronic processor may be electronically connected, where such electronic connection may be comprised of a wired connection and/or a wireless connection which facilitates exchanges of data between the two components that communicate with other using Wi-Fi technology, a generic term meaning any technology designed to enable a wireless exchange of data over a network. One or more of the system electronic processors may be programmed to execute the method embodied herein and discussed in detail below.

In an embodiment of FIG. 1, the trackline data generator 140 could be comprised of any electronic processor configured to generate and send a trackline data using a transmission control protocol ("TCP") via an address (i.e., the trackline address) corresponding to an IP address and port number of a TCP connection; the generating and sending of the trackline data may be performed in response to a request made by the Airshow app running on the PED 160. The trackline data may be comprised of navigation data provided by a source of navigation data 132 such as the ground track information of the track over the ground already flown by the aircraft. For a viewer of the PED 160 who has launched the Airshow app after the aircraft has departed, the ground track information may be used to plot the track already flown. When the trackline data is broadcast, the Airshow app running on the PED 160 and listening for the trackline data may use the ground track information in the generation of an image data set as discussed in detail below.

In an embodiment of FIG. 1, the discovery datagram generator 150 could be comprised of any electronic processor configured to repeatedly generate and send a discovery datagram using a UDP via an address (i.e., the discovery address) corresponding to an IP address and port number of a UDP broadcast. The discovery datagram may be comprised of a plurality of addresses including an address associated with the URL of the FTP/HTTP server 120, an address associated with the IP of the UDP broadcast of the flight navigation datagram, and the address associated with the IP of the TCP connection of the trackline data. Also, version information of the custom map configuration file 122 may be included in the discovery datagram.

In the embodiments of FIG. 1, the PED 160 may be comprised of any mobile device configured with a display and configured to perform the method of the Airshow app discussed in detail below. Examples of the PED 160 include, but are not limited to, the iPad, the iPhone, and the MacBook, each of which are produced by Apple. Also, the PED 160 may be configured with Wi-Fi technology to listen for datagrams generated by the flight navigation datagram generator 130 and the discovery datagram generator 150, and to exchange communications with the FTP/HTTP server 120 and the trackline generator 140.

Figure 2A:
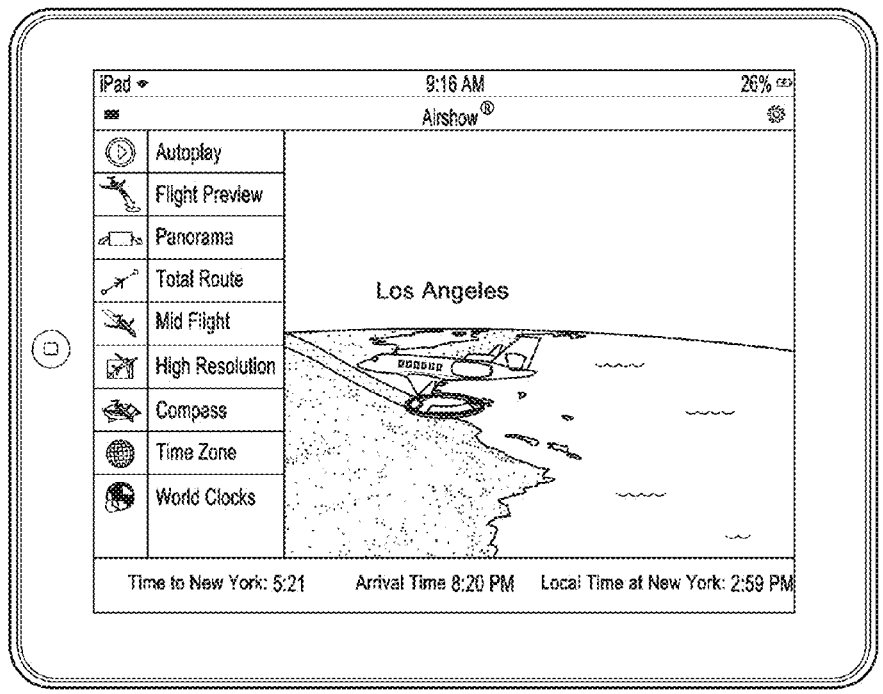
FIG. 2A illustrates an image of a three-dimensional image of flight information displayed on the PED.
Figure 2B:
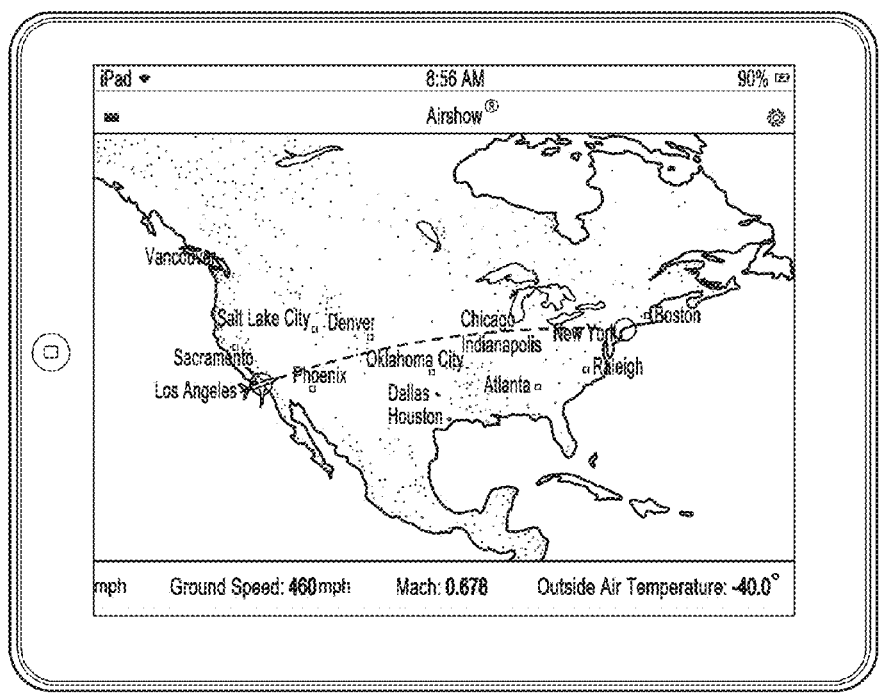
FIG. 2B illustrates an image of a three-dimensional image of flight information displayed on the PED

The advantages and benefits of the embodiments discussed herein may be illustrated by showing examples in FIGS. 2A and 2B of how flight information may be acquired and presented to the viewer of the PED 160. In these examples, it will be assumed that the viewer is onboard an aircraft that has departed Los Angeles International Airport ("LAX") in Los Angeles, Calif., United States for John F. Kennedy International Airport ("JFK") located in New York City, N.Y., United States. Although the following examples will be drawn to an LAX-JFK flight, these examples are provided for the sole purpose of illustration and not limitation.

Referring to FIG. 2A, flight information is presented as three-dimensional image displayed on the PED 160. As illustrated, the image is comprised of the sky, a spherical surface of Earth, a curved flight path, and a symbol of an aircraft. The sky and spherical surface form a background that is overlaid by the curved flight path and aircraft symbol. The information displayed to the viewer may be configurable by the viewer. As shown in FIG. 2A, the viewer has chosen a user-selectable menu (shown on the left-hand side of the image), and a ticker of flight information (shown at the bottom of the image).

Referring to FIG. 2B, flight information is presented as two-dimensional image displayed on the PED 160. As illustrated, the image is comprised of the surface of Earth and a flight path, a flight path (which happens to be a great circle), and a symbol of an aircraft. The surface forms a background that is overlaid by the flight path and aircraft symbol. As shown in FIG. 2B, the viewer has chosen a ticker of flight information for display along with the two-dimensional image.

Figure 3:
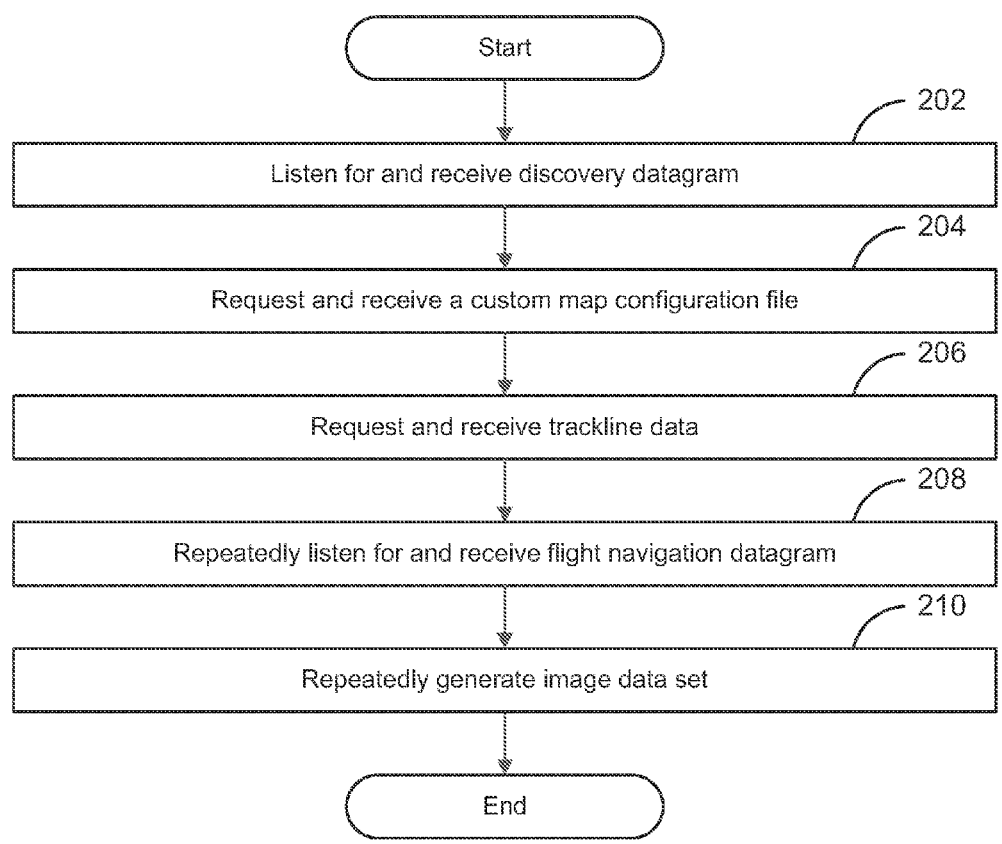
FIG. 3 depicts a flowchart for receiving distributed in-flight information on a PED.

Referring to FIG. 3, flowchart 200 is depicted disclosing an example of a method for receiving a distribution of in-flight information that is displayed for the viewer on the PED 160, where the PED 160 may be configured with an application (e.g., the Airshow app) comprised of instructions that correspond to the following modules. As necessary for the accomplishment of the following modules embodied in the flowchart, the receiving of data is synonymous and/or interchangeable with the retrieving of data, and the providing of data is synonymous and/or interchangeable with the making available or supplying of data.

Flowchart 200 begins in FIG. 3 with module 202 with the listening for and receiving of a discovery datagram upon the launch of an application, where such operations may be performed at the time when the application is launched via the discovery address associated with IP address and port number of the UDP broadcast of the discovery datagram.

The discovery datagram could be comprised of address information associated with one or more providers of datagrams such as the flight navigation datagram generator 130 and the trackline data generator 140; it could also be comprised of address information associated with the URL of the FTP/HTTP server 120 and/or a version number of the custom map configuration file 122. Some of these addresses may not be necessary for a default configuration. For example, if the owner or operator has not customized the displays shown on the screen of the PED 160, the address associated with the URL may be excluded from the discovery datagram. Similarly, if the owner or operator decides to present no ground track information of the track already flown at the time the application is launched, the address associated with the IP address and port number of the TCP connection of a trackline data may be excluded from the discovery datagram.

The flowchart continues with module 204 with the requesting and receiving of a custom map configuration file 122 from the FTP/HTTP server 120, where these operations may be performed via the address information associated with the URL of the FTP/HTTP server 120 as provided in the discovery datagram. This request may be performed if a custom map configuration file does not currently exist in the PED 160. If each custom map configuration file has been assigned a version number (which could allow for or track future file updates), the request may be performed if the version number of the existing file in the PED 160 does not match the version number stated in the discovery datagram. After the request is received, the FTP/HTTP server 120 may respond by sending the custom map configuration file 122 through the connection made via the address information associated with the URL.

The flowchart continues with module 206 with the requesting and receiving of trackline data datagram from the trackline data generator 140. The request could be sent to the address associated with the IP address and port number of the TCP connection of a trackline data as provided in the discovery datagram.

The flowchart continues with module 208 with the listening for and receiving of a flight navigation datagram representative of navigation data provided by a source of navigation data 132. These operations may be repeatedly performed via the flight navigation address associated with IP address and port number of the UDP broadcast of the flight navigation datagram.

The flowchart continues with module 210 with the repeated generating of an image data set based upon the contents of the navigation data, the custom map configuration file (if requested), and the trackline data (if requested). In one embodiment, the image data set could be representative of a three-dimensional scene comprised of the sky, the spherical surface of the Earth, an aircraft symbol, and a curved flight path as shown in FIG. 2A. The background of the three-dimensional scene may be comprised of the sky and the spherical surface of the Earth. The curved flight path could overlay the background, where the path could be presented as three-dimensional and representative of and coinciding with the active flight plan of the aircraft; similarly, the aircraft symbol could overlay the background of the three-dimensional scene, where the symbol could be three-dimensional and representative of and coinciding with the location of the aircraft.

In another embodiment, the image data set could be representative of a two-dimensional scene comprised of the surface of the Earth, an aircraft symbol, and a flight path as shown in FIG. 2B. The background of the two-dimensional scene may be comprised of the surface of the Earth, and the flight path and the aircraft symbol could overlay the background. The flight path may representative of and coinciding with the active flight plan of the aircraft, and the aircraft symbol may representative of and coinciding with the location of the aircraft. Also, the flight path could also include the ground track of the track of the aircraft already flown, where ground track information may have been provided in the trackline data and/or maintained by the application using aircraft location information of sequential flight navigation datagrams. Then, the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. An avionics system for distributing in-flight information to an occupant of an aircraft viewing a portable electronic device, such system comprising:

a discovery datagram generator configured to
generate a discovery datagram comprised of a first address of an internet protocol ("IP") address and port number of a user datagram protocol ("UDP") broadcast of a flight navigation datagram, a second address of a uniform resource location ("URL") of a file transfer protocol/hypertext transfer protocol ("FTP/HTTP") server, and a version number of a custom map configuration file, and broadcast the discovery datagram via a discovery address of an IP address and port number of a discovery datagram UDP broadcast;

a flight navigation datagram generator configured to
receive navigation data representative of flight navigation information from an aircraft navigation system, and generate and broadcast repeatedly via the first address a flight navigation datagram comprised of the navigation data;

the FTP/HTTP server
comprised of the custom map configuration file, and
configured to send via the second address the custom map configuration file in response to a request for the custom map configuration file, where
the custom map configuration file is comprised of information content customized by an owner or operator of an aircraft; and a portable electronic device ("PED") configured to
listen for and receive the discovery datagram via the discovery address upon the launch of an application,
listen for and receive the flight navigation datagram repeatedly via the first address,
request and receive the custom map configuration file via the second address if
a custom map configuration file with the version number included in the discovery datagram is not located in the PED, and
generate an image data set repeatedly based upon
the navigation data received in the flight navigation datagram, and
the information content of the custom map configuration file.

2. The avionics system of claim 1, wherein a cabin entertainment unit is comprised of
the discovery datagram generator,
the flight navigation datagram generator, and
the FTP/HTTP server.

3. The avionics system of claim 1, further comprising:
a trackline data generator configured to
generate and send to the PED via a third address a trackline data in response to a request for trackline data, where
the trackline data is comprised of the navigation data representative of an actual ground track of the aircraft, such that
the discovery datagram generated by the discovery datagram generator is further comprised of
the third address, where
the third address is an IP address and port number of a transmission control protocol ("TCP") connection of the trackline data, and
the PED is further configured to
request and receive the trackline data via the third address, whereby
the basis for generating the image data set includes the trackline data.

4. The avionics system of claim 3, wherein a cabin entertainment unit is comprised of the discovery datagram generator,
the flight navigation datagram generator,
the FTP/HTTP server, and
the trackline data generator.

5. The avionics system of claim 1, wherein
the image data set is representative of a three-dimensional scene comprised of the sky, the spherical surface of the Earth, an aircraft symbol, and a curved flight path, whereby
the background of the three-dimensional scene is comprised of the sky and the spherical surface of the Earth,
the curved flight path
overlays the background of the three-dimensional scene, and
is representative of and coincides with the active flight path, and
the aircraft symbol
overlays the background of the three-dimensional scene, and
is representative of and coincides with the location of the aircraft.

6. The avionics system of claim 1, wherein
the image data set is representative of a two-dimensional scene comprised of the surface of the Earth, an aircraft symbol, and a flight path, whereby
the background of the two-dimensional scene is comprised of the surface of the Earth,
the flight path
overlays the background of the two-dimensional scene, and
is representative of and coincides with the active flight path, and the aircraft symbol
overlays the background of the two-dimensional scene, and
is representative of and coincides with the location of the aircraft.

7. An avionics device for distributing in-flight information to a portable electronic device located on-board an aircraft, such device comprising:
a discovery datagram generator configured to
generate a discovery datagram comprised of
a first address of an IP address and port number of a UDP broadcast of a flight navigation datagram,
a second address of a URL of an FTP/HTTP server, and
a version number of a custom map configuration file, and
broadcast the discovery datagram to a PED located inside an aircraft via a discovery address of an IP address and port number of a discovery datagram UDP broadcast, where
the PED is configured to listen for and receive the discovery datagram via the discovery address upon the launch of an application;
a flight navigation datagram generator configured to
receive navigation data representative of flight navigation information from an aircraft navigation system, and
generate and broadcast to the PED repeatedly via the first address a flight navigation datagram comprised of the navigation data, where
the PED is configured to listen for and receive the flight navigation datagram repeatedly via the first address; and
the FTP/HTTP server
comprised of the custom map configuration file, and configured to send to the PED via the second address the custom map configuration file in response to a request for the custom map configuration file, where
the custom map configuration file is comprised of information content customized by an owner or operator of an aircraft, and
the PED is configured to request and receive the custom map configuration file via the second address if a custom map configuration file with the version number included in the discovery datagram is not located in the PED.

8. The avionics device of claim 7, further comprising:
a trackline data generator configured to
generate and send to the PED via a third address a trackline data in response to a request for trackline data, where
the trackline data is comprised of the navigation data representative of an actual ground track of the aircraft, such that
the discovery datagram generated by the discovery datagram generator is further comprised of
the third address, where
the third address is an IP address and port number of a TCP connection of the trackline data.

9. A method for receiving a distribution of in-flight information presented on a portable electronic device located onboard an aircraft, such method comprising:
listening for and receiving a discovery datagram via a discovery address upon the launch of an application, where
the discovery datagram is generated by a discovery datagram generator and broadcast via the discovery address of an IP address and port number of a discovery datagram UDP broadcast, and
the discovery datagram is comprised of
a first address of an IP address and port number of a UDP broadcast of a flight navigation datagram,
a second address of a URL of an FTP/HTTP server, and
a version number of a custom map configuration file;
listening for and receiving the flight navigation datagram repeatedly via the first address, where
a flight navigation datagram generator of an avionics system is configured to
receive navigation data representative of flight navigation information from an aircraft navigation system, and
generate and broadcast repeatedly via the first address the flight navigation datagram comprised of the navigation data;
requesting and receiving the custom map configuration file from the FTP/HTTP server via the second address if
a custom map configuration file with the version number included in the discovery datagram is not located in the PED, where
the custom map configuration file is comprised of information content customized by an owner or operator of an aircraft; and
generating an image data set repeatedly based upon
the navigation data received in the flight navigation datagram, and
the information content of the custom map configuration file.

10. The method of claim 9, further comprising:
requesting and receiving trackline data via a third address, where
the discovery datagram is further comprised of
the third address, where
the third address is an IP address and port number of a TCP connection of a trackline data, and
a trackline data generator of the avionics system is configured to
generate and send the trackline data comprised of the navigation data representative of an actual ground track of the aircraft, whereby
the basis for generating the image data set includes the navigation data received in the trackline data.

11. The method of claim 9, wherein
the image data set is representative of a three-dimensional scene comprised of the sky, the spherical surface of the Earth, an aircraft symbol, and a curved flight path, whereby
the background of the three-dimensional scene is comprised of the sky and the spherical surface of the Earth,
the curved flight path
overlays the background of the three-dimensional scene, and
is representative of and coincides with the active flight path, and the aircraft symbol
overlays the background of the three-dimensional scene, and
is representative of and coincides with the location of the aircraft.

12. The method of claim 9, wherein
the image data set is representative of a two-dimensional scene comprised of the surface of the Earth, an aircraft symbol, and a flight path, whereby
the background of the two-dimensional scene is comprised of the surface of the Earth, the flight path
overlays the background of the two-dimensional scene, and
is representative of and coincides with the active flight path, and the aircraft symbol
overlays the background of the two-dimensional scene, and
is representative of and coincides with the location of the aircraft.

* * * * *